United States Patent Office 3,504,918
Patented Apr. 7, 1970

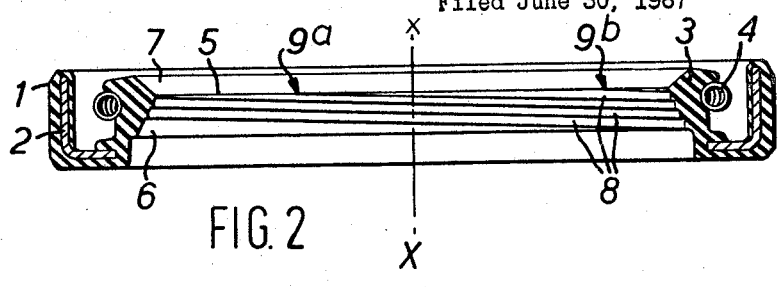
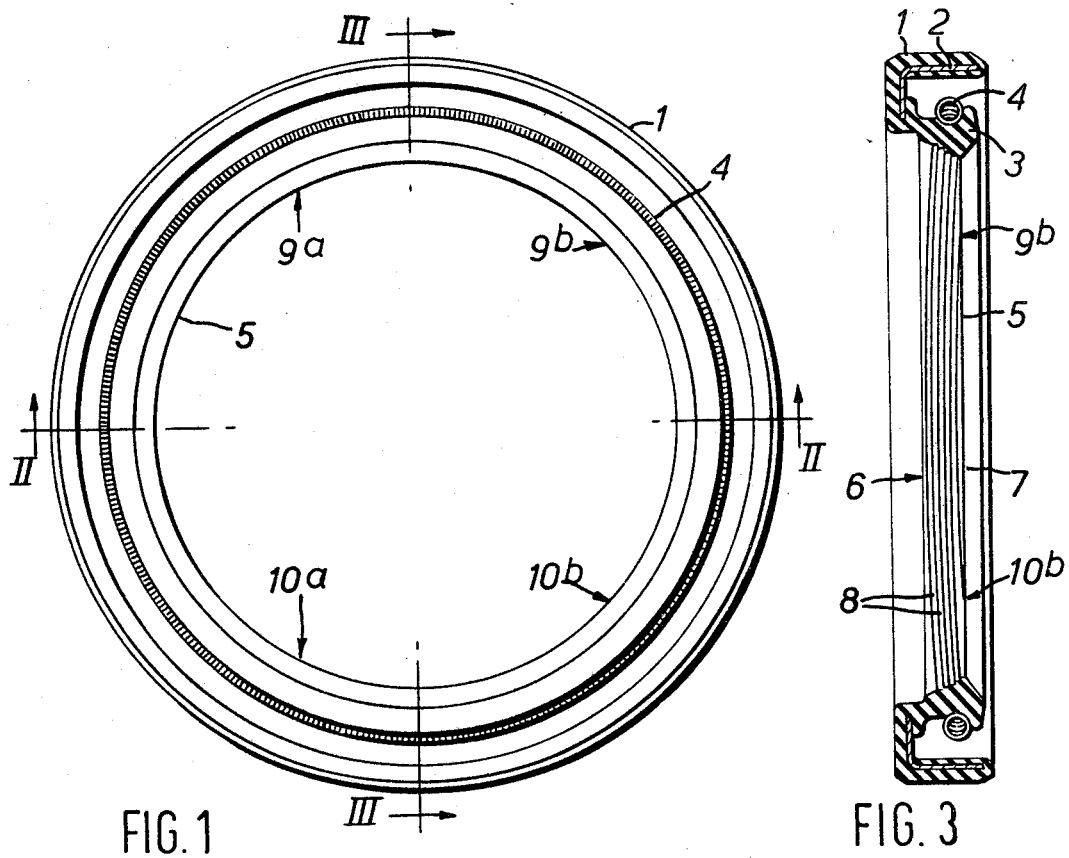
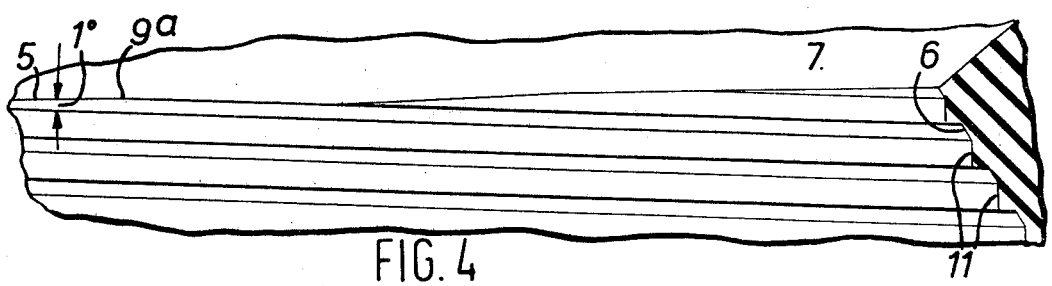

3,504,918
SHAFT SEALS
Geoffrey Walton Halliday, Whitley Bay, Northumberland, England, assignor to George Angus & Company Limited, Newcastle-upon-Tyne, England
Filed June 30, 1967, Ser. No. 650,333
Claims priority, application Great Britain, July 7, 1966, 30,627/66
Int. Cl. F16j 15/32, 15/48
U.S. Cl. 277—134                                    7 Claims

ABSTRACT OF THE DISCLOSURE

A lip-type shaft seal with a sealing band formed between opposite frustoconical surfaces has fluid feed-back vane surfaces meeting the sealing band in opposite peripheral directions at a small angle so as to give a feed-back effect in either direction of relative rotation.

---

This invention relates to shaft seals, also known as oil seals, designed for sealing against fluid leakage along shafts, such as engine crankshafts or motor vehicle drive-transmission shafts, which are difficult to seal because of such factors as shaft deflection, torsional oscillation and eccentricity in motion.

It has long been known that the sealing of such shafts can be improved by providing at the sealed periphery some form of return feed screw, or feed-back scroll, formed by a helical ridge or groove on the shaft or seal surface. By suitable selection of the direction of the helix in relation to the normal direction of rotation of the shaft, the effect of relative rotation is to feed back oil or other fluid tending to leak past the seal.

The most convenient way of providing a feed-back effect is to form the required ridge or groove on the sealing periphery of the seal so that shaft modification is not required and the seal will operate on the cylindrical surface of any shaft of the appropriate size.

Known feed-back seals will give satisfactory results in one direction of rotation for which they are designed but for reversible shafts, in particular motor vehicle drive or transmission shafts, there is a requirement for a feed-back seal which will serve in either direction of rotation.

The present invention provides a shaft seal of a known lip type but designed to provide a feed-back effect in either direction of rotation.

According to the invention, a shaft seal comprises a moulded sealing ring of resilient material having a peripheral sealing lip with a circumferential sealing band between inner and outer frustoconical surfaces, respectively facing towards and away from seal fluid when the seal is in use, in which there is provided, extending arcuately around part of the outer frustoconical surface, at least one vane surface member, formed by a ridge or groove, of which the ends intercept the sealing band in opposite peripheral directions and present a pair of oppositely-directed vane surfaces meeting the sealing band at an angle of not more than 20° to the plane of the sealing band.

For best results, and also taking into account the moulding of a preferred seal as described below, the angle of the vane surfaces is preferably substantially smaller, in particular between 1° and 5°.

Usually, in a sealing ring as manufactured, the sealing band is an edge formed by the junction of the frustoconical surfaces but initial wear of a sealing ring in use, known as "bedding-in," axially widens the edge to a narrow band, also known as the "contact band." A corresponding band could however be formed, instead of an edge, in manufacture of a sealing ring.

The term "vane surface member" has been chosen as a descriptive and generic term for a ridge or groove presenting a surface which, on rotation relatively to a fluid to which it is exposed, will impel the fluid.

In the seal of the present invention, the vane surfaces act like helical pump vanes to feed back oil tending to leak past the sealing edge and it is found that oppositely-directed vane surfaces intercepting, i.e. meeting or extending into, the sealing band at a small angle are effective to feed back oil in either direction of shaft rotation.

This duo-directional effect is surprising, since it could be expected that oppositely-directed similar vane surfaces would have equal and opposite effects on the oil, and the effect is not at present fully understood.

However, the sealing effect of a resilient lip shaft seal itself is not fully understood, there being variable factors which are difficult to observe or determine, such as the deflection of the resilient lip as a result of lip-loading and shaft movement and the existence of an oil film between the lip and the surface against which it seals.

What has been established by tests is that seals in accordance with the present invention do give a duo-directional feed-back effect.

A shaft seal in accordance with the invention will be described, by way of a preferred example, with reference to the accompanying drawing, in which:

FIG. 1 is a plan view of an internal lip type shaft seal in accordance with the invention, FIGS. 2 and 3 are diametral axial sections, on the lines II—II and III—III respectively of FIG. 1, FIG. 4 is a fragmentary radial section showing, on an enlarged scale, and somewhat exaggerated for the purpose of illustration, a part of the sealing band and the profile of ridges illustrated in FIGURES 2 and 3.

The seal illustrated is basically of a known kind, comprising a moulded sealing ring, of oil-resistant synthetic rubber or like elastomeric resilient material, the ring being of channel-section having an outer cylindrical wall 1 stiffened by an L-section reinforcing ring 2, to form a holding portion for mounting the seal in a shaft housing, and a flexible flange 3 embraced by a garter spring 4.

The inner periphery of the flange 3 provides a sealing lip, to seal around the cylindrical surface of a shaft, having a circular sealing edge 5 formed by the junction of a moulded frustoconical outer surface 6, which faces outwardly away from the sealed fluid when the seal is in use, and a cut frustoconical inner surface 7 which faces the sealed fluid in use.

The inner frustoconical surface 7 is cut, by a trimming knife against which the moulded seal is turned, so as to obtain the desired angle of the surface 7 and accurate formation and location of the sealing edge 5.

As so far described, the seal illustrated is of known construction and it is also known for the outer frustoconical surface 6 to be moulded with a screw-thread or helical ridges or grooves so as to give a feed-back effect, due to relative shaft rotation, on fluid leaking past the sealing edge 5.

The novel feature of the present invention is the provision of the surface 6 with at least one vane surface member of which the ends meet the sealing edge 5 in opposite peripheral directions and at a small angle. As embodied in the seal illustrated, the surface 6 has moulded therein van surface members formed by a stepped series of substantially L-section peripheral parallel ridges 8 each lying in a plane slightly oblique, at 1° as illustrated (FIG. 4), to the plane of the sealing edge 5. The angle of obliquity of the ridges is the angle at which their ends meet the sealing edge. This can be selected to suit requirements but, in a seal as illustrated, should not be greater than 5°, preferably not greater than 3°.

For moulding the ridges 8, there is used a frustoconical die member having in its frustoconical surface a series of circular grooves which are stepped in diameter and are complementary to the ridges 8 to be moulded. The grooves are formed by turning in a lathe in which the die member is rotated about an axis slightly oblique to its own longitudinal axis. The circular grooves so turned, and the resulting moulded ridges, are mutually parallel, and the centres of their circles are successively offset from the axis of the frustoconical surface.

In the sealing ring as moulded, at least two of the ridges 8 cross the plane of the eventual sealing edge 5 and when this edge is formed by cutting of the inner frustoconical surface 7, the arcuate portions of ridges 8 beyond the plane of the edge 5 are cut off leaving the remainder of such ridges each with two ends, intercepting the edge 5. In the figures, the two ends of one ridge 8 are designated 9a and 10a, and the two ends of the second ridge are designated 9b and 10b.

The ends 9a, 9b, 10a and 10b of the ridges 8 form the required vane surfaces intercepting the sealing edge 5 which, when bedded-in by initial wear in use, becomes modified to a sealing band of greater axial width. Also, it must be remembered that the sealing lip is stretched slightly when fitted on a shaft and is also constricted by the garter spring 4 so that the resultant radial level load on the resilient material of the lip still further modifies the character of the sealing band in contact with the shaft.

The depth and spacing of the ridges 8 are exaggerated to relatively large dimensions in the drawing for the purpose of illustration.

In practice, the ridges 8 are much finer, the actual dimensions being determined to suit the size and type of seal. For example, in a seal for a shaft having a diameter of 3 inches (7.62 cm.), the ridges may each have a radial depth of 0.005 inch (0.127 mm.) and an axial depth of approximately 0.009 inch (0.22 mm.) with the pitch of the ridges equal to 48 per inch (19 per cm.).

Although the ridges 8 lie slightly oblique to the plane of the seal, their flank surfaces 11 (FIG. 4) can, by the use of a suitably-shaped tool tip in turning the moulding die member, be made cylindrical about the axis X—X of the sealing ring which permits true axial withdrawal of the sealing ring from its mould without risk of damage to the ridges.

In the above description, the vane surface members are described as formed by "ridges" but it will be understood that a stepped frustoconical surface can be regarded as having "ridges" or "grooves." Consequently, the invention includes the provision of vane surface members by means of ridges or grooves.

The invention has been described and illustrated as applied to an internal shaft seal but it could be applied to an external seal which, as is well known, is mounted on a shaft to rotate therewith and seal against a surrounding cylindrical surface of a housing. In an external seal, the relative positions of the holding portion wall 1 and the flange 3 are inverted and the garter spring 4 acts radially outwardly.

I claim:
1. A shaft seal comprising a moulded sealing ring of resilient material having a peripheral sealing lip, said lip having inner and outer, mutually convergent, peripheral frustoconical surfaces, respectively facing towards and away from the fluid-sealing side of the seal, a continuous circumferential sealing band coaxial with said ring being defined on said lip by the convergence of said frustoconical surfaces, at least one vane member extending arcuately around part of said outer frustoconical surface, said vane member having two ends which intercept said continuous circumferential sealing band respectively in opposite circumferential directions at an angle of not more than 20° to the plane of said sealing band, said vane member also having flank surfaces between said ends, said ends of said vane member presenting a pair of oppositely-directed flank surfaces progressively joining said sealing band, and said pair of flank surfaces being operative as vane surfaces, for one direction and the other respectively of relative shaft rotation when the seal is in use, to sweep back to the sealing band fluid leaking past said sealing band.

2. A shaft seal according to claim 1, in which said outer frustoconical surface has moulded therein a stepped series of peripheral parallel ridges, each said ridge lying in a plane oblique to the plane of said sealing band, and at least one of said ridges forms a said vane member.

3. A shaft seal according to claim 2, in which said ridges are each substantially of L-section with one flank surface substantially cylindrical about the axis of said sealing ring.

4. A shaft seal according to claim 3, in which each said ridge lies in plane oblique to the plane of said sealing band at an angle of not more than 5°.

5. A shaft seal according to claim 4, in which said angle is not more than 3°.

6. A shaft seal according to claim 1, in which said ends of said vane member intercepts said sealing band at an angle of not more than 5°.

7. A shaft seal according to claim 6, in which said angle is not more than 3°.

References Cited

UNITED STATES PATENTS

| 2,446,380 | 8/1948 | Meyers et al. | 277—134 X |
| 3,376,045 | 4/1968 | Jagger | 277—134 |

FOREIGN PATENTS

| 499,480 | 1/1939 | Great Britain. |

SAMUEL ROTHBERG, Primary Examiner